(12) United States Patent
Miranda et al.

(10) Patent No.: US 12,429,223 B2
(45) Date of Patent: Sep. 30, 2025

(54) FUEL SUPPLY SYSTEM FOR A COMBUSTOR

(71) Applicant: General Electric Company, Schenectady, NY (US)

(72) Inventors: Carlos Miranda, Lyman, SC (US); Michael John Hughes, State College, PA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 20 days.

(21) Appl. No.: 17/697,285

(22) Filed: Mar. 17, 2022

(65) Prior Publication Data
US 2023/0296253 A1    Sep. 21, 2023

(51) Int. Cl.
*F23R 3/34* (2006.01)
*F01K 23/10* (2006.01)
*F02C 7/22* (2006.01)
*F02C 7/224* (2006.01)

(52) U.S. Cl.
CPC ............ *F23R 3/346* (2013.01); *F01K 23/106* (2013.01); *F02C 7/222* (2013.01); *F02C 7/224* (2013.01)

(58) Field of Classification Search
CPC .. F23R 3/346; F23R 3/34; F02C 7/224; F02C 7/228; F02C 7/222; F02C 6/08; F01K 23/10
See application file for complete search history.

(56) References Cited

U.S. PATENT DOCUMENTS

| 5,845,481 A | 12/1998 | Briesch et al. |
| 6,105,370 A | 8/2000 | Weber |
| 6,311,471 B1 * | 11/2001 | Waldherr ............... F23R 3/283 60/39.55 |
| 7,565,805 B2 * | 7/2009 | Steber .................... F23N 5/003 60/776 |
| 7,895,821 B2 | 3/2011 | Annigeri et al. |
| 9,976,522 B2 * | 5/2018 | Patel ...................... F02M 29/06 |
| 2012/0102914 A1 | 5/2012 | Kirzhner et al. |
| 2013/0014514 A1 * | 1/2013 | Romig .................... F02C 7/224 60/776 |

(Continued)

FOREIGN PATENT DOCUMENTS

JP    H04124521 A    4/1992

OTHER PUBLICATIONS

European Search Report Corresponding to U.S. Appl. No. 23/159,575 on Jul. 31, 2023.

*Primary Examiner* — Devon C Kramer
*Assistant Examiner* — Jingchen Liu
(74) *Attorney, Agent, or Firm* — Dority & Manning, P.A.

(57) ABSTRACT

A gas turbine combustion system includes a combustor that has at least two injection stages each configured to inject fuel into a combustion chamber of the combustor. A fuel supply circuit is in fluid communication with the at least two injection stages for providing the fuel from a fuel supply to the injection stages. The fuel supply circuit includes at least two branches, each branch being fluidly coupled to a respective injection stage. The gas turbine combustion system further includes at least two heat exchangers fluidly coupled to a thermal fluid supply. Each heat exchanger is disposed in thermal communication on a respective branch of the at least two branches for modifying a temperature of fuel within the respective branch.

15 Claims, 6 Drawing Sheets

(56) References Cited

U.S. PATENT DOCUMENTS

| | | | |
|---|---|---|---|
| 2013/0091852 A1 | 4/2013 | Wood et al. | |
| 2015/0059348 A1* | 3/2015 | Toronto | F02C 5/12 |
| | | | 60/39.38 |
| 2017/0356342 A1* | 12/2017 | Leach | F02C 7/222 |
| 2017/0363004 A1* | 12/2017 | Xu | F23R 3/283 |
| 2021/0254547 A1* | 8/2021 | Deng | F01K 27/02 |

* cited by examiner

FUEL SUPPLY SYSTEM FOR A COMBUSTOR

FIELD

The present disclosure relates generally to a system for supplying fuel to one or more stages of a gas turbine combustor. Particularly, the disclosure relates to a system for supplying and independently heating fuel to the one or more stages of the gas turbine combustor.

BACKGROUND

A gas turbine power plant such as a combined cycle power plant (CCPP) generally includes a gas turbine having a compressor section, a combustor section, a turbine section, a heat recovery steam generator (HRSG) that is disposed downstream from the gas turbine, and at least one steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine section where it progressively expands as it flows across alternating stages of stationary vanes and rotatable turbine blades, which are coupled to a rotor shaft. Kinetic energy is transferred from the combustion gas to the turbine blades, thus causing the rotor shaft to rotate. The rotational energy of the rotor shaft may be converted to electrical energy via a generator. The combustion gas exits the gas turbine as exhaust gas, and the exhaust gas enters the HRSG. Thermal energy from the exhaust gas is transferred to water flowing through one or more heat exchangers of the HRSG, thereby producing superheated steam. The superheated steam is then routed into the steam turbine, which may be used to generate additional electricity, thus enhancing overall power plant efficiency.

Traditional gas turbine engines include one or more combustors that burn a mixture of natural gas and air within the combustion chamber to generate the high pressure and temperature combustion gases. As a byproduct, oxides of nitrogen (NOx) and other pollutants (such as $CO_2$) are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Burning a mixture of natural gas and high amounts of hydrogen and/or burning pure hydrogen instead of natural gas within the combustor would significantly reduce or eliminate the emission of NOx and other pollutants (such as $CO_2$). However, the physical properties of hydrogen are different from those of natural gas, leading to different burning characteristics, which determine levels of combustion dynamics, mass flow through the combustor, and flame speed exiting the fuel nozzles, for example. Thus, traditional fueling and combustion systems are not capable of providing high levels of hydrogen and/or pure hydrogen to the combustor without issue. For example, due to hydrogen's high reactivity, simply providing high levels of hydrogen and/or pure hydrogen as a fuel within a traditional combustion system could promote flashback or flame holding conditions in which the combustion flame migrates towards the fuel being supplied by the nozzles, possibly causing severe damage to the nozzles in a relatively short amount of time.

Additionally, it is common to heat natural gas fuel supplied to a traditional combustion system to close the temperature differential between the fuel supply and the compressed air entering the combustor, thereby reducing the amount of fuel needed to reach the desired firing temperature and increasing gas turbine power output. Because heating hydrogen-containing fuels will lower their density and increase their velocity, the issues described above may be exacerbated.

As such, an improved fueling system that allows for a flexible and efficient combustion system to burn alternative fuels, such as hydrogen, is desired and would be appreciated in the art.

BRIEF DESCRIPTION

Aspects and advantages of the gas turbine combustion systems and combined cycle power plants in accordance with the present disclosure will be set forth in part in the following description, or may be obvious from the description, or may be learned through practice of the technology.

In accordance with one embodiment, a gas turbine combustion system is provided. The gas turbine combustion system includes a combustor that includes at least two injection stages each configured to inject fuel into a combustion chamber of the combustor. The gas turbine combustion system further includes a fuel supply circuit in that is in fluid communication with the at least two injection stages for providing the fuel from a fuel supply to the at least two injection stages. The fuel supply circuit includes at least two branches. Each branch of the at least two branches is fluidly coupled to a respective injection stage of the at least two injection stage. The gas turbine combustion system further includes at least two heat exchangers that are fluidly coupled to a thermal fluid supply. Each heat exchanger of the at least two heat exchangers is disposed in thermal communication on a respective branch of the at least two branches for modifying a temperature of fuel within the respective branch.

In accordance with another embodiment, a gas turbine combustion system is provided. The gas turbine combustion system includes a combustor that includes a first injection stage, a second injection stage, and a third injection stage each configured to inject a fluid into a combustion chamber of the combustor. The gas turbine combustion system further includes a fuel supply circuit that is in fluid communication with at least the first injection stage and the second injection stage for providing a fuel as the fluid to each of the first injection stage and the second injection stage. The fuel supply circuit includes a first branch that extends to the first injection stage and a second branch that extends to the second injection stage. The gas turbine combustion system further includes at least one heat exchanger that is disposed in thermal communication on one of the first branch and the second branch.

In accordance with yet another embodiment, a combined cycle power plant (CCPP) is provided. The CCPP includes a gas turbine comprising a gas turbine combustion system, a steam turbine, and a heat recovery steam generator (HRSG) fluidly coupled to and between the gas turbine and the steam turbine. The gas turbine combustion system includes a combustor that includes at least two injection stages each configured to inject fuel into a combustion chamber of the combustor. The gas turbine combustion system further includes a fuel supply circuit in that is in fluid communication with the at least two injection stages for providing the fuel from a fuel supply to the at least two injection stages. The fuel supply circuit includes at least two branches. Each branch of the at least two branches is fluidly coupled to a respective injection stage of the at least two injection stage. The gas turbine combustion system further includes at least two heat exchangers that are fluidly coupled to a thermal fluid supply. Each heat exchanger of the at least two heat exchangers is disposed in thermal communication on a respective branch of the at least two branches for modifying a temperature of fuel within the respective branch.

These and other features, aspects and advantages of the present gas turbine combustion systems and combined cycle power plants will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present gas turbine combustion systems and combined cycle power plants, including the best mode of making and using the present systems and methods, directed to one of ordinary skill in the art, is set forth in the specification, which makes reference to the appended figures, in which.

DETAILED DESCRIPTION

Figure 1:
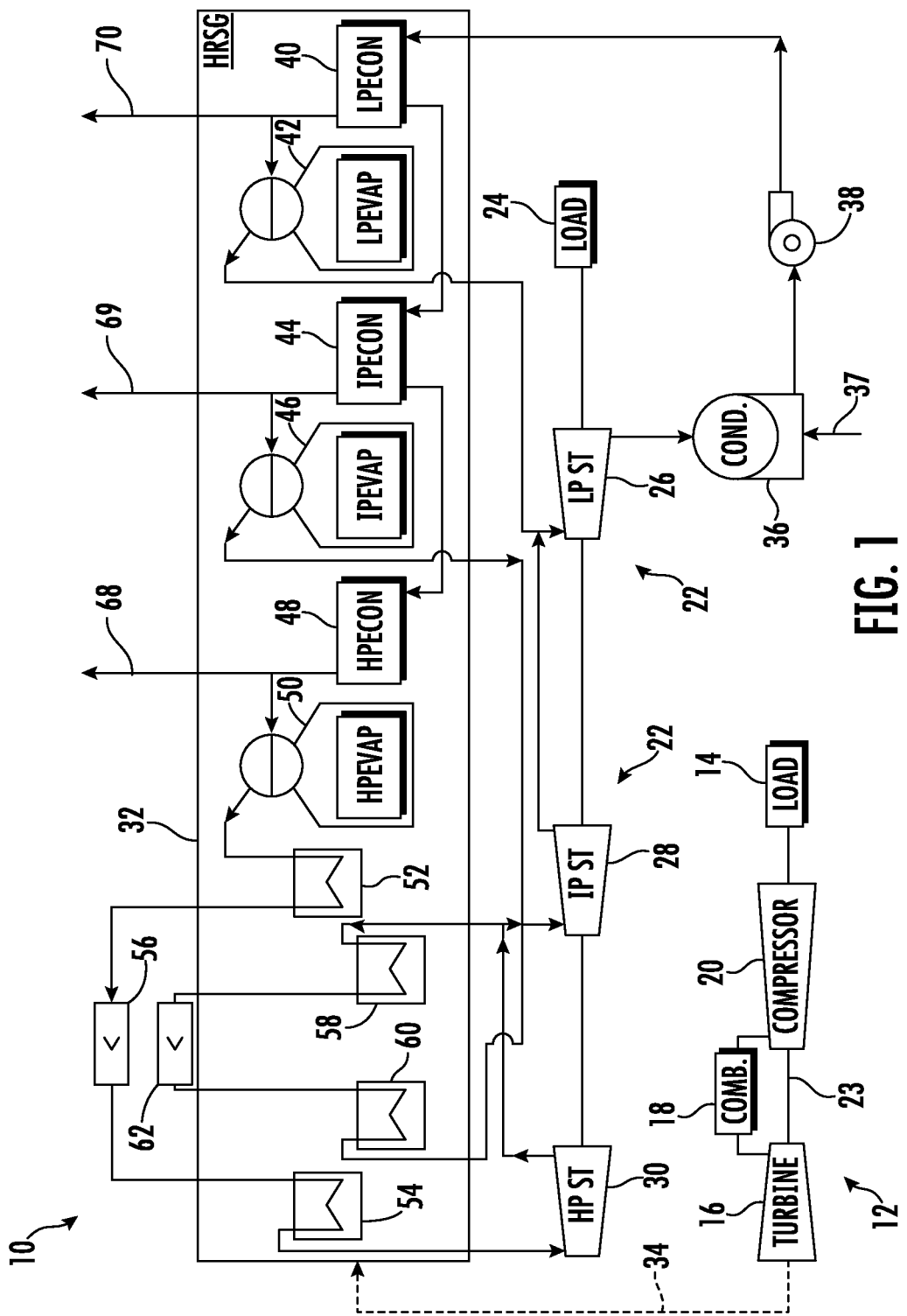
FIG. 1 is a schematic illustration of a combined cycle power plant (CCPP) in accordance with embodiments of the present disclosure.

Reference now will be made in detail to embodiments of the present gas turbine combustion systems and combined cycle power plants, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified. The term "thermal communication" means that heat is transferred through a barrier or wall between a first fluid and a second fluid without the first fluid being in direct contact with the second fluid.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The terms "axial" or "axially" refer to the relative direction that is substantially parallel and/or coaxially aligned to an axial centerline of a particular component (e.g., the combustor or the gas turbine); the terms "radial" or "radially" refer to the relative direction that is substantially perpendicular to the axial centerline of a particular component; and the terms "circumferential" or "circumferentially" refer to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value or the precision of the methods or machines for constructing or manufacturing the components and/or systems. In at least some instances, the approximating language may correspond to the precision of an instrument for measuring the value or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof are intended to cover a nonexclusive inclusion. For example, a process, method, article, or apparatus that comprises a list of features is not necessarily limited only to those features but may include other features not expressly listed or inherent to such process, method, article, or apparatus. Further, unless expressly stated to the contrary, the term "or" refers to an inclusive or and not to an exclusive or. For example, a condition A or B is satisfied by any one of the following: A is true (or present), and B is false (or not present); A is false (or not present), and B is true (or present); and both A and B are true (or present).

Here and throughout the specification and claims, where range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic flow diagram of an embodiment of a combined cycle power generation system or combined cycle power plant (CCPP) 10. The CCPP 10 may include a gas turbine 12 for driving a first load 14. The first load 14 may be, for instance, an electrical generator for producing electrical power. The gas turbine 12 may include a turbine section 16, combustors 18, and a compressor section 20. The turbine section 16 and the compressor section 20 may be connected by one or more shafts 23.

During operation of the gas turbine 12, a working fluid such as air flows into the compressor section 20 where the air is progressively compressed, thus providing compressed air to the combustors 18. The compressed air is mixed with fuel and burned within each combustor 18 to produce combustion gases. The combustion gases flow through the hot gas path from the combustors 18 into the turbine section 16, wherein energy (kinetic and/or thermal) is transferred from the combustion gases to the rotor blades, causing the one or more shafts 23 to rotate. The mechanical rotational energy may then be used to power the compressor section 20 and/or to generate electricity via the load 14. Heated exhaust gas 34 exiting the turbine section 16 may then be exhausted from the gas turbine 12 and into a heat recovery steam generator (HRSG) 32 before exiting to the atmosphere via an exhaust stack (not shown).

The CCPP 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The CCPP 10 may also include an HRSG 32 having multiple stages. The components of the HRSG 32 in the illustrated embodiment are a simplified depiction of the HRSG 32 and are not intended to be limiting. Rather, the illustrated HRSG 32 is shown to describe the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may be directed, in turn, into a low-pressure section of the HRSG 32 with the aid of a condensate pump 38.

The condensate may flow through a low-pressure economizer 40 (LPECON), which is a device configured to heat feedwater (e.g., the condensate) with higher temperature gases. From the low-pressure economizer 40, the condensate may be directed either into a low-pressure evaporator 42 (LPEVAP) or toward an intermediate-pressure economizer 44 (IPECON). Steam from the low-pressure evaporator 42 may be returned to the low-pressure section 26 of the steam turbine 22. Likewise, from the intermediate-pressure economizer 44, the condensate may be directed either into an intermediate-pressure evaporator 46 (IPEVAP) or toward a high-pressure economizer 48 (HPECON). In addition, water and/or steam from the intermediate-pressure economizer 44 may be sent to one or more fuel heat exchangers (e.g., re-heater 60) where the water and/or steam may be used to heat fuel gas for use in the combustor 18 of the gas turbine 12. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely representative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may be directed, in turn, into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and the secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as CCPP 10, hot exhaust 34 may flow from the gas turbine 12 and pass through the HRSG 32 and may be used to generate high-pressure, high-temperature steam, as well as high-temperature water. The steam produced by the HRSG 32 may be passed through the steam turbine 22 for power generation via load 24. In addition, the produced steam may also be supplied to any other processes where superheated steam may be used.

The gas turbine 12 power generation cycle is often referred to as the "topping cycle," whereas the steam turbine 22 power generation cycle is often referred to as the "bottoming cycle." By combining these two cycles as illustrated in FIG. 1, the combined cycle power plant 10 may lead to higher power output and greater efficiencies in both cycles. In particular, exhaust heat from the topping cycle may be captured and used to generate steam for use in the bottoming cycle.

The CCPP 10 advantageously recaptures heat from the heated exhaust gas 34 by using the HRSG 32. As illustrated in FIG. 1, components of the gas turbine 12 and the HRSG 32 may be separated into discrete functional units. In other words, the gas turbine 12 may generate the heated exhaust gas 34 and direct the heated exhaust gas 34 toward the HRSG 32, which may be primarily responsible for recapturing the heat from the heated exhaust gas 34 by generating superheated steam. In turn, the superheated steam may be used by the steam turbine 22 as a source of power. The heated exhaust gas 34 may be transferred to the HRSG 32 through a series of ductwork, which may vary based on the particular design of the CCPP 10.

In exemplary embodiments, heated water (or other thermal fluid) from the HPECON 48, the IPECON 44, and the LPECON 40 may be extracted and used for one or more other operations in the CCPP 10 and/or the gas turbine 12. For example, HPECON water 68 may be extracted from the HPECON 48, IPECON water 69 may be extracted from the IPECON 44, and LPECON water 70 may be extracted from the LPECON 40. In many embodiments, the HPECON water 68 may be a higher temperature (and pressure in some embodiments) than both the IPECON water 69 and the LPECON water 70. Additionally, the IPECON water 69 may be a higher temperature (and pressure in some embodiments) than the LPECON water 70.

Figure 2:
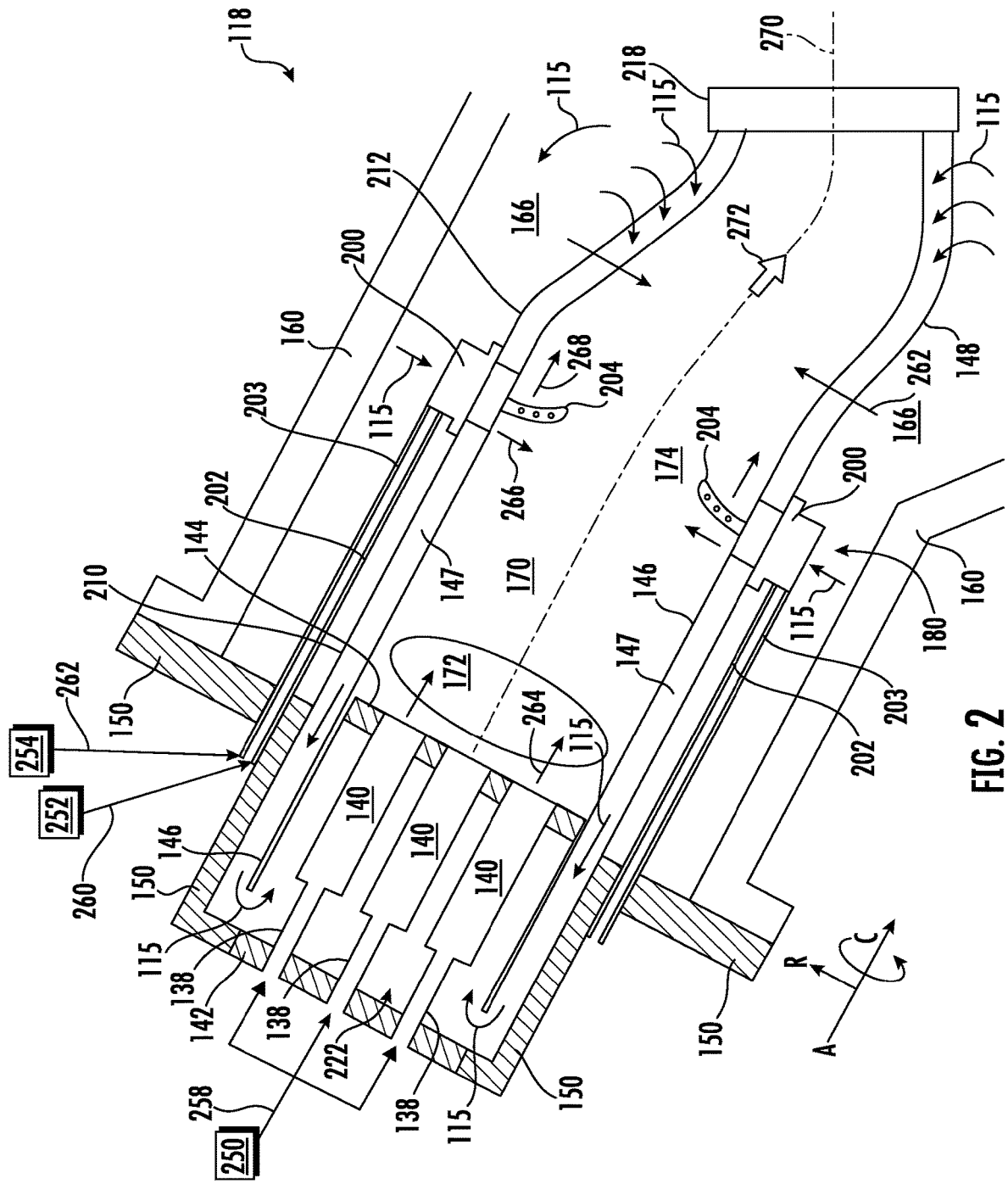
FIG. 2 is a cross-sectional schematic view of a combustor in accordance with embodiments of the present disclosure.

FIG. 2 is a schematic representation of a combustor 18, as may be included in a can annular combustion system for the gas turbine 12. In a can annular combustion system, a plurality of combustors 18 (e.g., 8, 10, 12, 14, 16, or more) are positioned in an annular array about the shaft 23 that connects the compressor section 20 to the turbine section 16.

As shown in FIG. 2, the combustor 18 may define an axial direction A that extends along an axial centerline 270. The combustor may also define a circumferential direction C which extends around the axial direction A and the axial centerline 270. The combustor 18 may further define a radial direction R perpendicular to the axial direction A and the axial centerline 270.

The combustor 18 of FIG. 2 includes a combustion liner 146 that defines a combustion chamber 170. The combustion liner 146 may be positioned within (i.e., circumferentially surrounded by) an outer sleeve 148, such that an annulus 147 is formed therebetween. At least one fuel nozzle 140 may be positioned at the forward end of the combustor 18. Fuel may be directed through first fuel supply conduits 138, which extend through an end cover 142, and into the fuel nozzles 140. The fuel nozzles 140 convey the fuel and compressed air 115 into a primary combustion zone 172, where combustion occurs. In some embodiments, the fuel and compressed air 115 are combined as a mixture prior to reaching the primary combustion zone 172. The combustor 18 further includes one or more exemplary fuel injection assemblies 180 (also referred to as an axial fuel staging (AFS) system) downstream of the fuel nozzles 140, as discussed further herein.

The combustion liner 146 may contain and convey combustion gases to the turbine section 16. The combustion liner 146 defines the combustion chamber 170 within which combustion occurs. As shown in FIG. 2, the combustion liner 146 may extend between the fuel nozzles 140 and an aft frame 218. The combustion liner 146 may have a cylindrical liner portion and a tapered transition portion that is separate from the cylindrical liner portion, as in many conventional combustion systems. Alternately, the combustion liner 146 may have a unified body (or "unibody") construction, in which the cylindrical portion and the tapered portion are integrated with one another. Thus, any discussion of the combustion liner 146 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 16 are integrated into a single unit, sometimes referred to as a "transition nozzle" or an "integrated exit piece."

As described above, the combustion liner 146 may be surrounded by an outer sleeve 148, which is spaced radially outward of the combustion liner 146 to define the annulus 147 through which compressed air 115 flows to a head end of the combustor 18. Heat is transferred convectively from the combustion liner 146 to the compressed air 115, thus cooling the combustion liner 146 and warming the compressed air 115.

In exemplary embodiments, the outer sleeve 148 may include a flow sleeve 210 at the forward end and an impingement sleeve 212 at the aft end. The flow sleeve 210 and the impingement sleeve 212 may be coupled to one another. Alternately, the outer sleeve 148 may have a unified body (or "unisleeve") construction, in which the flow sleeve 210 and the impingement sleeve 212 are integrated with one another in the axial direction. As before, any discussion of the outer sleeve 148 herein is intended to encompass both conventional combustion systems having a separate flow sleeve 210 and impingement sleeve 212 and combustion systems having a unisleeve outer sleeve.

The forward casing 150 and the end cover 142 of the combustor 18 define a head end air plenum 222, which includes one or more fuel nozzles 140. The fuel nozzles 140 may be any type of fuel nozzle, such as bundled tube fuel nozzles 300 (FIG. 3, often referred to as "micromixers") or swirler nozzles (often referred to as "swozzles"). For example, the fuel nozzles 140 are positioned within the head end air plenum 222 defined at least partially by the forward casing 150. In many embodiments, the fuel nozzles 140 may extend from the end cover 142. For example, each fuel nozzle 140 may be coupled to an aft surface of the end cover 142 via a flange (not shown). As shown in FIG. 2, the at least one fuel nozzle 140 may be partially surrounded by the combustion liner 146. The aft, or downstream ends, of the fuel nozzles 140 extend through a cap plate 144 that defines the upstream end of the combustion chamber 170.

The fuel nozzles 140 may be in fluid communication with a first fuel supply 250 configured to supply a first fuel 258 to the fuel nozzles 140. In many embodiments, the first fuel 258 may be a fuel mixture containing natural gas (such as methane, ethane, propane, or other suitable natural gas) and hydrogen. In other embodiments, the first fuel 258 may be pure natural gas or pure hydrogen (e.g., 100% hydrogen, which may or may not contain some amount of contaminants), such that the first fuel 258 is not a mixture of multiple fuels.

In exemplary embodiments, the first fuel 258 and compressed air 115 may mix together within the fuel nozzles 140 to form a first mixture of compressed air 115 and the first fuel 258 before being ejected (or injected) by the fuel nozzles 140 into the primary combustion zone 172. The first mixture of the first fuel 258 and compressed air 115 may be injected into the primary combustion zone 172 and ignited to generate a first flow of combustion gases 264 having a first temperature.

As discussed below, during operation of the combustor 18 on a total fuel input that comprises a high amount of hydrogen (e.g., greater than about 80%), the temperature of combustion gases within the primary combustion zone 172 (e.g., the first flow of combustion gases 264) may be the lowest temperature of any combustion gases within the combustion chamber 170 (e.g., lower than the combustion gases within the secondary combustion zone 174). Operated in this way, the temperature of combustion gases within the primary combustion zone 172 may be a lower temperature than combustion gases in the secondary combustion zone 174, which may advantageously enable the combustor 18 to operate on high amounts of hydrogen without creating potentially damaging flame holding and/or flashback conditions.

The forward casing 150 may be fluidly and mechanically connected to a compressor discharge casing 160, which defines a high pressure plenum 166 around the combustion liner 146 and the outer sleeve 148. Compressed air 115 from the compressor section 20 travels through the high pressure plenum 166 and enters the combustor 18 via apertures (not shown) in the downstream end of the outer sleeve 148 (as indicated by arrows near an aft frame 218). Compressed air travels upstream through the annulus 147 and is turned by the end cover 142 to enter the fuel nozzles 140 and to cool the head end. In particular, compressed air 115 flows from high pressure plenum 166 into the annulus 147 at an aft end of the combustor 18, via openings defined in the outer sleeve 148. The compressed air 115 travels upstream from the aft end of the combustor 18 to the head end air plenum 222, where the compressed air 115 reverses direction and enters the fuel nozzles 140.

In the exemplary embodiment, a fuel injection assembly 180 is provided to deliver a second fuel/air mixture and/or a flow of pure fuel (e.g., 100% fuel, such as hydrogen, not mixed with air or other oxidants) to a secondary combustion zone 174. For example, a second flow of fuel and air may be introduced by one or more premix injectors 200 to the secondary combustion zone 174, and a flow of supplemental fuel (unmixed with air or oxidants) may be introduced by one or more supplemental or immersed injectors 204.

The primary combustion zone 172 and the secondary combustion zone 174 may each be portions of the combustion chamber 170 and therefore may be defined by the combustion liner 146. For example, the primary combustion zone 172 may be defined from an outlet of the fuel nozzles 140 to the premix injector 200, and the secondary combustion zone 174 may be defined from the premix injector 200 to the aft frame 218. In this arrangement, the forwardmost boundary of the premix injector 200 may define the end of the primary combustion zone 172 and the beginning of the secondary combustion zone 174 (e.g., at an axial location where a second flow of fuel and air are introduced).

Such a combustion system having axially separated combustion zones is described as an "axial fuel staging" (AFS) system. The fuel injection assemblies 180 may be circumferentially spaced apart from one another on the outer sleeve 148 (e.g., equally spaced apart in some embodiments). In many embodiments, the combustor 18 may include four fuel injection assemblies 180 spaced apart from one another and configured to inject a second mixture of fuel and air into a secondary combustion zone 174 via the premix injector 200 and configured to inject a flow of pure supplemental fuel (e.g., pure hydrogen or a mixture of fuels without oxidants) via the immersed injector 204, in order to increase the volume and temperature of the combustion gases 34. In other embodiments, the combustor 18 may include any number of fuel injection assemblies 180 (e.g., 1, 2, 3, or up to 10).

As shown in FIG. 2, each fuel injection assembly 180 may include a premix injector 200, an immersed injector 204, a second fuel supply conduit 202 that supplies a second fuel (such as pure hydrogen or a natural gas and hydrogen mixture comprising greater than 80% hydrogen) to the premix injector 200, and a third fuel supply conduit 203 that supplies a pure fuel (e.g., a fuel mixture or pure hydrogen) to the immersed injector 204. For example, each premix injector 200 may be in fluid communication, at least partially via the second fuel supply conduit 202, with a second fuel supply 252 configured to supply a second fuel 260 to each premix injector 200 where the second fuel 260 is mixed with air before being introduced into the secondary combustion zone 174. In many embodiments, the second fuel 260 may be a fuel mixture containing natural gas (such as methane, ethane, propane, or other suitable natural gas) and hydrogen. In other embodiments, the second fuel 260 may be pure natural gas or pure hydrogen (e.g., 100% hydrogen), such that the second fuel includes no other fuels mixed therein.

Similarly, each immersed injector 204 may be in fluid communication, at least partially via the third fuel supply conduit 203, with a third fuel supply 254 configured to supply a third fuel 262 to each immersed injector 204 where the third fuel is directly introduced into the secondary combustion zone 174 without mixing with air before introduction. In exemplary embodiments, the third fuel 262 may be pure fuel (e.g., a fuel mixture or pure hydrogen). In some embodiments, the first fuel supply 250, the second fuel supply 252, and the third fuel supply 254 may be a common fuel supply, such that the same fuel mixture is provided to the fuel nozzles 140, the premix injector 200, and the immersed injector 204 (as shown in FIGS. 4 through 7, where the first fuel supply 506 is common to all the injection stages 514, 516, and 518). Alternatively, the first fuel supply 250 and the second fuel supply 252 may be a common fuel supply, such that the same fuel or fuel mixture is provided to the fuel nozzles 140 and the premix injector 200. In such embodiments, the third fuel supply 254 may be an independent fuel supply, such that the immersed injector 204 receives a different fuel or fuel mixture than the fuel nozzles 140 and the premix injector 200 (as shown in FIG. 8).

Because the fuel nozzles 140, the premix injectors 200, and the immersed injectors 204 may be separately fueled (e.g., via the fuel supplies 250, 252, and 254), they may allow the combustor 18 a wide range of operational flexibility. For example, each of the fuel nozzles 140, the premix injectors 200, and the immersed injectors 204 may be supplied with a different fuel or fuel mixture. Particularly, in exemplary embodiments, each of the fuel nozzles 140, the premix injectors 200, and the immersed injectors 204 may be supplied pure hydrogen or a fuel mixture that contains mostly hydrogen (e.g., greater than 80% hydrogen) and natural gas (such as methane, ethane, propane, or other natural gas). However, it should be appreciated that, in some embodiments, each of the fuel nozzles 140, the premix injectors 200, and the immersed injectors 204 may be fueled by the same fuel supply, such that the same fuel mixture or pure fuel is supplied to all of the fuel nozzles 140, the premix injectors 200, and the immersed injectors 204.

As used herein, the term "premix" may be used to describe a component, passage, or cavity in which fuel and air are mixed together prior to being injected into the combustion chamber 170. In many embodiments, each premix injector 200 may fluidly couple the high pressure plenum 166 to the secondary combustion zone 174. For example, compressed air 115 from the high pressure plenum 166 may enter the premix injector 200 where the compressed air 115 is mixed with the second fuel 260 prior to being injected into the secondary combustion zone 174. For example, in exemplary embodiments, each premix injector 200 may extend through the outer sleeve 148, the annulus 147, and the combustion liner 146 to direct flow into the secondary combustion zone 174. Specifically, the premix injectors 200 may each extend radially from the high pressure plenum 166, through the outer sleeve 148, the annulus 147, and the combustion liner 146, such that the premix injector 200 is capable of delivering a second flow of fuel and air to the secondary combustion zone 174. The premix injectors 200 may be coupled to the combustion liner 146 and/or the outer sleeve 148, such that each premix injector 200 introduces the second fuel/air mixture as a jet entering a cross-flow (such as at an angle, oblique, orthogonal, slantwise, diagonally, transverse, or nonparallel) of the combustion gases 264 produced in the primary combustion zone 172. In an exemplary configuration, the premix injectors 200 introduce the second fuel/air mixture in a radial direction relative to the longitudinal axis 270 of the combustor 18. The second fuel/air mixture(s) are ignited by the combustion gases 264 from the primary combustion zone 172 and burn in the secondary combustion zone 174.

The premix injector 200 may be coupled to the outer sleeve 148 and may extend through the outer sleeve 148 and the combustion liner 146. In one embodiment, a boss (not shown) supporting the premix injector 200 functions as a fastener for securing the outer sleeve 148 to the combustion liner 146. In other embodiments, the premix injector 200 may be coupled to the outer sleeve 148 in any suitable manner, and the outer sleeve 148 may have any suitable number of components coupled between the flange of the forward casing 150 and the turbine nozzle in any suitable manner that permits the fuel injection assembly 180 to function as described herein.

In exemplary embodiments, the second fuel 260 and compressed air 115 may mix together within the premix injectors 200 to form a second mixture of compressed air 115 and the second fuel 260 before being ejected (or injected) by the premix injectors 200 into the secondary combustion zone 174. The second mixture of the second fuel 260 and compressed air 115 may be injected (e.g., as a cross-flow, such as generally radially) into the secondary combustion zone 174 and ignited to generate a second flow of combustion gases 266 having a second temperature.

The immersed injector 204 may extend radially through the premix injector (e.g., through the center of the premix injector 200) and into the secondary combustion zone 174. For example, the immersed injector 204 may extend radially into the secondary combustion zone 174 of the combustion chamber 170, such that the immersed injector 204 is directly exposed to combustion gases during operation of the combustor 18. As described above, although the immersed injector 204 extends through the premix injector 200, the immersed injector 204 may be fluidly isolated from the premix injector 200. In this arrangement, the immersed injector 204 may separately inject a flow of third fuel 262 (e.g., a fuel mixture, such as hydrogen and natural gas, or entirely fuel, such as pure hydrogen not mixed with air or other oxidants) directly into the secondary combustion zone 174 to generate a third flow of combustion gases 268. In this way, the third fuel 262 may be introduced by the immersed injector 204 (or supplemental injector) as a supplemental fuel that generates additional combustion gases proximate the exit of the combustion chamber 170 (e.g., closer to the aft frame 218 than the end cover 142), which may advantageously allow the combustor 18 to generate outlet combustion gases 272 having a more desirable emissions profile and having a desired outlet temperature without any potentially dangerous flashback or flame holding events.

As should be appreciated, the third fuel 262 may be introduced without premixing (i.e., no air or other oxidants are mixed therein prior to introduction into the combustion zone 174). Thus, the third fuel 262, as delivered and as introduced, may be a pure fuel or pure hydrogen. In exemplary implementations, the first flow of combustion gases 264, the second flow of combustion gases 266, and the third flow of combustion gases 268 may mix together within the secondary combustion zone 174 to form outlet combustion gases 272 (34 in FIG. 1) having a target outlet temperature. The outlet combustion gases 272 may exit the combustor 18 via the aft frame 218 and enter the turbine section 16 of the gas turbine 12.

Although the immersed injector 204 in FIG. 2 extends radially through the premix injector 200 and into the secondary combustion zone 174, it should be understood that the immersed injector 204 may be axially spaced apart and disposed downstream from the premix injector 200 with respect to the flow of combustion gases. For example, the immersed injector 204 may be disposed axially between the premix injector 200 and the aft frame 218 with respect to the axial centerline 270. In such embodiments, the immersed injector 204 may extend independently through the outer sleeve 148, the annulus 147, and the combustion liner 146 and into the secondary combustion zone 174.

Figure 3:
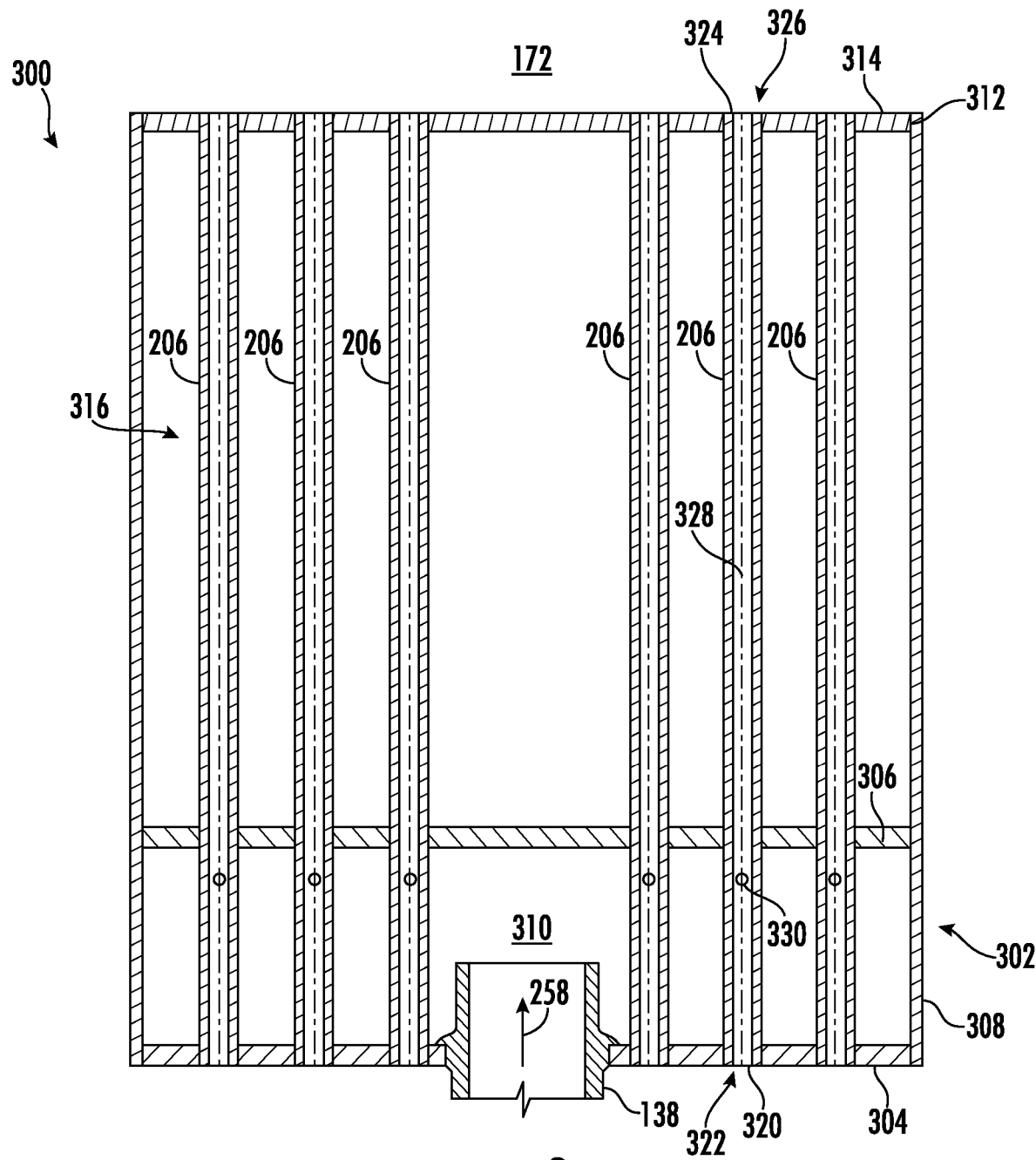
FIG. 3 is a cross-sectional side view of a portion of a bundled tube fuel nozzle in accordance with embodiments of the present disclosure.

FIG. 3 provides a cross-sectional side view of a portion of a bundled tube fuel nozzle 300. In exemplary embodiments, the one or more fuel nozzles 140 shown in FIG. 2 may each be a bundled tube fuel nozzle 300. As shown in FIG. 3, the bundled tube fuel nozzle 300 includes a fuel plenum body 302 having a forward or upstream plate 304, an aft plate 306 axially spaced from the forward plate 304 and an outer band 308 that extends axially between the forward plate 304 and the aft plate 306. A fuel plenum 310 is defined within the fuel plenum body 302. In particular embodiments, the forward plate 304, the aft plate 306 and the outer band 308 may at least partially define the fuel plenum 310. In particular embodiments, the first fuel supply conduit 138 may extend through the forward plate 304 to provide fuel (such as pure hydrogen or a fuel mixture comprising greater than 80% hydrogen) to the fuel plenum 310. In various embodiments, the bundled tube fuel nozzle 300 includes a cap plate 312 axially spaced from the aft plate 306. A hot side 314 of the cap plate 312 is generally disposed adjacent or proximate to the primary combustion zone 172. The cap plate 312 may be unique to each bundled tube fuel nozzle 300 or may be common among all the bundled tube fuel nozzles 300 (e.g., such as the cap plate 144 shown in FIG. 2).

As shown in FIG. 3, the bundled tube fuel nozzle 300 may include a tube bundle 316 comprising a plurality of premix tubes 206. Each premix tube 206 may extend through the forward plate 304, the fuel plenum 310, the aft plate 306, and the cap plate 312. The premix tubes 206 are fixedly connected to and/or form a seal against the aft plate 306. For example, the premix tubes 206 may be welded, brazed or otherwise connected to the aft plate 306 (e.g., formed integrally with the fuel plenum body 302 via additive manufacturing). Each premix tube 206 includes an inlet 320 defined at an upstream end 322 of each respective tube 206, an outlet 324 defined at a downstream end 326 of each respective tube 206, and one or more fuel ports 330 defined between the inlet 320 and the aft plate 306.

Compressed air from the head end air plenum 222 may enter each of the premix tubes 206 at the inlet and may be mixed with fuel (introduced from fuel plenum 310 via the one or more fuel ports 330) before the fuel/air mixture is expelled into the primary combustion zone 172. For example, each premix tube 206 defines a respective premix flow passage 328 through the bundled tube fuel nozzle 300, in which fuel (such as pure hydrogen or a fuel mixture comprising greater than 80% hydrogen) may be mixed with compressed air.

Figure 4:
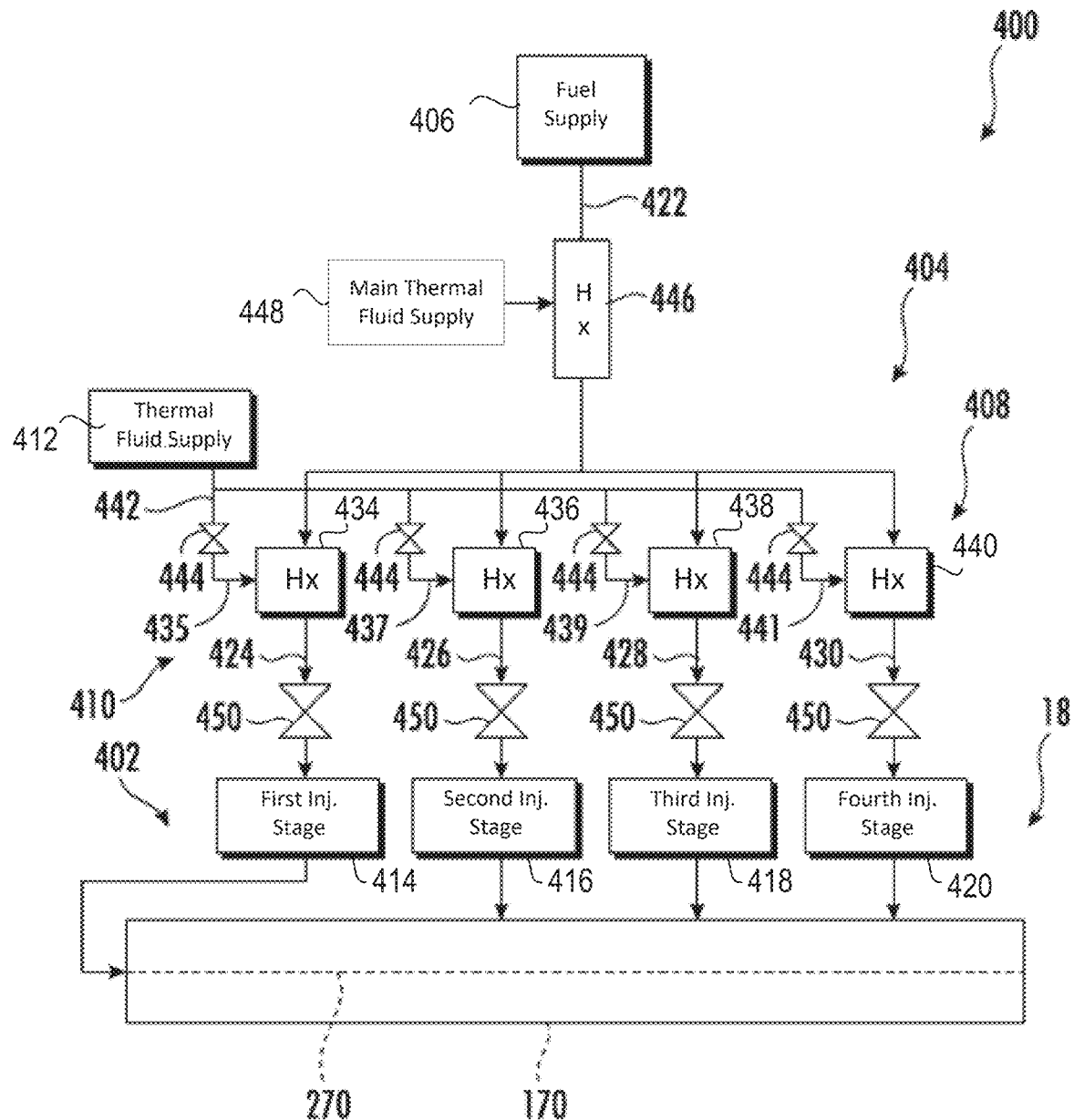
FIG. 4 is a schematic of a gas turbine combustion system in accordance with embodiments of the present disclosure.

Referring now to FIG. 4, a gas turbine combustion system 400 is illustrated in accordance with embodiments of the present disclosure. As shown, the gas turbine combustion system 400 may include a combustor 18 (such as the combustor 18 discussed above with reference to FIG. 2 or another combustor). The combustor 18 may include at least two injection stages 402. Each injection stage of the at least two injection stages 402 may be configured to inject a flow of fuel (such as a separate, individualized flow of fuel) into a combustion chamber 170 of the combustor 18. In exemplary embodiments, the at least two injection stages may be axially spaced apart from one another with respect to the axial centerline 270 of the combustor 18.

In many embodiments, the gas turbine combustion system 400 may further include a fuel supply circuit 404 in fluid communication with the at least two injection stages 402 for providing the fuel from a fuel supply 406 to the at least two injection stages 402. The fuel supply circuit 404 includes a main line 422 coupled to the fuel supply 406; two or more branches 408 fluidly coupled to the main line 422; one or more heat exchangers 410 respectively disposed on at least one of the two or more branches 408; fuel valves 450 downstream of the one or more heat exchangers 410; and, optionally, a main heat exchanger 446 fluidly coupled to a main thermal fluid supply 448 and disposed in thermal communication on the main line 422 upstream of the heat exchangers 410.

In many embodiments, the fuel supply 406 may contain a fuel mixture containing natural gas (such as methane, ethane, propane, or other suitable natural gas) and hydrogen. For example, the fuel mixture may include between about 60% hydrogen and about 90% hydrogen, or such as between about 70% hydrogen and about 90% hydrogen, or such as about 80% hydrogen (in each instance with the balance being natural gas). In other embodiments, the fuel supply 406 may contain a pure fuel, such as pure natural gas or pure hydrogen not mixed with any other fuels.

In various embodiments, the fuel supply circuit 404 includes at least two branches 408. Each branch of the at least two branches 408 may be fluidly coupled to a respective injection stage of the at least two injection stages 402. In this way, each branch of the at least two branches 408 may separately supply fuel to a respective injection stage of the at least two injection stages 402. As should be appreciated, the fuel supply circuit 404 may be a series of pipes, hoses, or other suitable structure for conveying fluid from one or more first locations to one or more second locations.

In exemplary embodiments, the gas turbine combustion system 400 further includes at least two heat exchangers 410 fluidly coupled to a thermal fluid supply 412. Each heat exchanger of the at least two heat exchangers 410 may be disposed in thermal communication on a respective branch of the at least two branches 408 for modifying a temperature of fuel within the respective branch of the at least two branches 408. In this way, a temperature of the fuel within each branch of the at least two branches 408 may be independently modified (e.g., increased or decreased) prior to injection into the combustion chamber 170. By independently modifying the fuel temperature at each injection stage, the combustor 18 may be capable of operation on a wider range of fuels, such as fuels containing high amounts of hydrogen (e.g., upwards of 80% hydrogen), which advantageously reduces NOx production.

As shown in FIG. 4, the at least two injection stages 402 may include a first injection stage 414, a second injection stage 416, a third injection stage 418, and a fourth injection stage 420. Each of the injection stages 414, 416, 418, 420 may be axially spaced apart from one another with respect to the axial centerline 270 of the combustor 18. For example, the first injection stage 414 may be configured to inject a fuel/air mixture (or only fuel not mixed with air) at the forward end of the combustion chamber 170 in a direction parallel to the axial centerline 270 (such as via the at least one fuel nozzles 140 shown in FIG. 2). In some embodiments, both the first injection stage 414 and the second injection stage 416 may be configured to inject a fuel/air mixture (or only fuel not mixed with air; or only air not mixed with fuel) at the forward end of the combustion chamber 170 in a direction parallel to the axial centerline 270 (such as via the at least one fuel nozzles 140 shown in FIG. 2). In other embodiments, the second injection stage 416, the third injection stage 418, the fourth injection stage 420, and any subsequent injection stage may be configured to inject an additional fuel/air mixture (or only fuel not mixed with air; or only air not mixed with fuel) downstream of the forward end of the combustor 18 in a direction generally perpendicular to the axial centerline 270 (such as via one or more axially spaced premix injectors 200 shown in FIG. 2).

Alternatively, or additionally, one or more of the second injection stage 416, the third injection stage 418, or the fourth injection stage 420 may be an immersed injector (such as the immersed injector 204 shown in FIG. 2) extending radially into the combustion chamber 170 at a unique axial location relative to other injection stages. In this way, each of the injection stages 414, 416, 418, 420 may separately inject a flow of fuel at a unique axial location. Although FIG. 4 illustrates four injection stages, the combustor 18 may include any number of injection stages (such as 1, 2, 3, 5, 6, or up to 10 or more) and should not be limited to any particular number of injection stages unless specifically recited in the claims.

In various embodiments, the injection stages 414, 416, 418, and 420 may be any combination of fuel nozzles (such as the fuel nozzles 140 shown in FIG. 2), premix injectors (such as the premix injectors 200 shown in FIG. 2), and/or immersed injectors (such as the immersed injectors 204 shown in FIG. 2). However, in exemplary embodiments, the first injection stage 414 and the second injection stage 416 may be one or more fuel nozzles 140 mounted to an end cover 142 and configured to inject a first flow of fuel into a primary combustion zone 172 of the combustor 18. Additionally, in exemplary embodiments, the third injection stage 418 may be a premix injector 200 coupled to the combustion liner 146 and disposed downstream from the fuel nozzle 140. The premix injector 200 may be configured to inject a second flow of fuel into a secondary combustion zone 174 of the combustor 18. Yet still further, in exemplary embodiments, the fourth injection stage 420 may be an immersed injector 204 disposed at the axial location of the premix injector 200. Alternatively, the fourth injection stage 420 may be an immersed injector 204 disposed downstream of the premix injector 200 with respect to the flow of combustion gases. As yet another alternative (not shown), the fourth injection stage 420 may be coupled to a second set of premix injectors 200 disposed downstream of the premix injectors 200 that are shown in FIG. 2 and that are associated with the third injection stage 418.

In each embodiment, the fuel supply circuit 404 includes the main line 422 extending from the fuel supply 406. Each branch of the at least two branches 408 extends from the main line 422, such that the main line 422 extends from the fuel supply 406 to the at least two branches 408. As used herein, the terms "line" and/or "branch" may each refer to a hose, pipe, fluid conduit, or other suitable structure used for conveying fluid. The at least two branches 408 of the fuel supply circuit 404 may include a first branch 424, a second branch 426, a third branch 428, and a fourth branch 430. The first branch 424 may be fluidly coupled to the first injection stage 414, the second branch 426 may be fluidly coupled to the second injection stage 416, the third branch 428 may be fluidly coupled to the third injection stage 418, and the fourth branch 430 may be fluidly coupled to the fourth injection stage 420. In this way, each injection stage 414, 416, 418, and 420 of the at least two injection stages 402 may be capable of delivering a unique (or different) amount of fuel at their respective axial locations relative to the other injection stages of the at least two injection stages 402.

In exemplary embodiments, the at least two heat exchangers 410 may include a first heat exchanger 434 disposed in thermal communication on the first branch 424, a second heat exchanger 436 disposed in thermal communication on the second branch 426, a third heat exchanger 438 disposed in thermal communication on the third branch 428, and a fourth heat exchanger 440 disposed in thermal communication on the fourth branch 430. Each heat exchanger 434, 436, 438, 440 is operable to adjust or modify (i.e., increase or decrease) a temperature of fuel within the respective branch 424, 426, 428, 430 to which the heat exchanger is attached.

For example, each heat exchanger 434, 436, 438, 440 may be coupled or attached to an exterior (or an interior) of the respective branch 424, 426, 428, 430 in order to thermally communicate (e.g., transfer heat) between the thermal fluid traveling through the heat exchanger and the fuel traveling through the respective branch. Each heat exchanger 434, 436, 438, 440 may be an indirect heat exchanger in which the thermal fluid is fluidly isolated from the respective branches 424, 426, 428, 430 to which the respective heat exchanger is attached, such that the thermal fluid traveling through the heat exchangers 434, 436, 438, 440 does not mix with the fuel in the branches 424, 426, 428, 430.

Each heat exchanger 434, 436, 438, 440 may be in fluid communication with a thermal fluid supply 412. For example, a thermal fluid supply line 442 may extend between the thermal fluid supply 412 and each of the heat exchangers 434, 436, 438, 440. The thermal fluid supply 412 may be a standalone tank, container, or other structure that holds and supplies thermal fluid (e.g., water, steam, or other suitable thermal fluid) to each of the heat exchangers 434, 436, 438, 440. Alternatively, or additionally, the thermal fluid supply 412 may be in fluid communication with the HRSG 32, such that the thermal fluid used in each heat exchanger 434, 436, 438, 440 is pulled from the HRSG 32. For example, the thermal fluid supply 412 may be fluidly coupled to one or more of the HPECON 48, the IPECON 44, and/or the LPECON 40, such that the thermal fluid supply 412 may supply HPECON water 68, IPECON water 69, and/or LPECON water 70 to each of the heat exchangers 434, 436, 438, and 440.

In many embodiments, the thermal fluid supply line 442 may include a first branch 435 fluidly coupled to the first heat exchanger 434, a second branch 437 fluidly coupled to the second heat exchanger 436, a third branch 439 fluidly coupled to the third heat exchanger 438, and a fourth branch 441 fluidly coupled to the fourth heat exchanger 440. In various embodiments, thermal fluid supply valves 444 may be disposed on each of the branches 435, 437, 439, and 441 for controlling a flow rate of thermal fluid to the heat exchangers 434, 436, 438, and 440. For example, the thermal fluid supply valves 444 may be selectively actuated between an open position and a closed position. For example, the thermal fluid supply valves 444 may be selectively opened to allow for flow of thermal fluid from the thermal fluid supply 412 to the respective heat exchanger 434, 436, 438, 440. By contrast, when the thermal fluid supply valves 444 are in a closed position, the flow of fluid from the thermal fluid supply 412 is restricted or otherwise prevented. Additionally, each of the thermal fluid supply valves 444 may be partially opened (e.g., not fully closed or fully open) to control rate of flow therethrough.

In particular embodiments, fuel valves 450 may be disposed on each of the branches 424, 426, 428, 430 for controlling a flow rate of fuel to injection stages 414, 416, 418, 420. For example, the fuel valves 450 may be independently actuated between an open position and a closed position. Particularly, the fuel valves 450 may be selectively opened to allow for a flow of fuel from the fuel supply 406 to the respective injection stage 414, 416, 418, 420. By contrast, when the fuel valves 450 are in a closed position, the flow of fuel from the fuel supply 406 is restricted or otherwise prevented. Additionally, each of the fuel valves 450 may be partially opened (e.g., not fully closed or fully open) to control rate of flow therethrough.

As shown in FIG. 4, the gas turbine combustion system 400 may further include a main heat exchanger 446 fluidly coupled to a main thermal fluid supply 448 and disposed in thermal communication on the main line 422 upstream of the at least two heat exchangers 410. For example, the main heat exchanger 446 may preheat the fuel prior to the fuel being split between the branches 424, 426, 428, 430. The main thermal fluid supply 448 may be a standalone tank, container, or other structure that holds and supplies thermal fluid (e.g., water, steam, or other suitable thermal fluid) to the main heat exchanger 446. Alternatively, the main thermal fluid supply 448 may be the same as the thermal fluid supply 412. Further, the main thermal fluid supply 448 may be fluidly coupled to one or more of the economizers HPECON 48, the IPECON 44, and/or the LPECON 40, such that the main thermal fluid supply 448 may supply HPECON water 68, IPECON water 69, and/or LPECON water 70 to the main heat exchanger 446.

FIGS. 5 through 8 illustrate various embodiments of a gas turbine combustion system 500 in accordance with alternative embodiments of the present disclosure. It should be appreciated that features shown and described with respect to the embodiments of FIGS. 5 through 8 can be combined with each other to yield still further embodiments. Thus, it is intended that the present disclosure covers such modifications and variations as come within the scope of the appended claims and their equivalents. The gas turbine combustion system 500 may allow for operation on a broader range of fuels and/or fuel mixtures than previous designs because of the independently heated injection stages. As shown, the gas turbine combustion system 500 may include a combustor 18 (such as the combustor 18 discussed above with reference to FIG. 2 or another combustor). The combustor 18 may include at least two injection stages 502. Each injection stage of the at least two injection stages 502 may be configured to inject a flow of fuel (such as a separate, individualized flow of fuel) into a combustion chamber 170 of the combustor 18. In exemplary embodiments, the at least two injection stages may be axially spaced apart from one another with respect to the axial centerline 270 of the combustor 18.

As shown in FIGS. 5 through 8, the at least two injection stages 502 may include a first injection stage 514, a second injection stage 516, and a third injection stage 518. Each of the injection stages 514, 516, 518 may be axially spaced apart from one another with respect to the axial centerline 270 of the combustor 18. Although FIGS. 5 through 8 illustrate three injection stages, the combustor 18 may include any number of injection stages (such as 1, 2, 3, 5, 6, or up to 10 or more) and should not be limited to any particular number of injection stages unless specifically recited in the claims.

In many embodiments, the gas turbine combustion system 500 may further include a fuel supply circuit 504 in fluid communication with the at least two injection stages 502 for providing the fuel from a first fuel supply 506 to the at least two injection stages 502. The fuel supply circuit 504 includes a main line 522 coupled to the first fuel supply 506; two or more branches 524, 526, 528 fluidly coupled to the main line 522; an optional bypass line 554 connecting two of the two or more branches 524, 526, 528; one or more heat exchangers 515, 517 respectively disposed on at least one of the two or more branches 524, 526, 528; fuel valves 550 downstream of the one or more heat exchangers 515, 517; and, optionally, a main heat exchanger (not shown) fluidly coupled to a main thermal fluid supply (not shown) and disposed in thermal communication on the main line 522 upstream of the heat exchangers 515, 517.

In many embodiments, the first fuel supply 506 may contain a fuel mixture containing natural gas (such as methane, ethane, propane, or other suitable natural gas) and hydrogen. For example, the fuel mixture may include between about 60% hydrogen and about 90% hydrogen, or such as between about 70% hydrogen and about 90% hydrogen, or such as about 80% hydrogen (in each instance with the balance being a natural gas). In other embodiments, the first fuel supply 506 may contain a pure fuel, such as pure natural gas or pure hydrogen not mixed with any other fuels.

In some embodiments, such as the embodiment shown in FIG. 8, the gas turbine combustion system 500 may further include a second fuel supply 507 fluidly coupled to a third injection stage 518 of the at least two injection stages 502. In such embodiments, the third injection stage 518 may be fluidly isolated from the first fuel supply 506 and other injection stages 514, 516. The second fuel supply 507 may contain a fuel (or fuel mixture) that is different from the fuel (or fuel mixture) of the first fuel supply 506. For example, in exemplary embodiments, the first fuel supply 506 may supply a fuel mixture containing natural gas (such as methane, ethane, propane, or other suitable natural gas) and hydrogen, and the second fuel supply 507 may contain a pure fuel, such as pure natural gas or pure hydrogen not mixed with any other fuels or air.

In various embodiments, the fuel supply circuit 504 may include a first branch 524 extending to the first injection stage 514, a second branch 526 extending to the second injection stage 516, and a third branch 528 extending to the third injection stage 518. In this way, each branch 524, 526, 528 may separately supply fuel to a respective injection stage 514, 516, 518. In the embodiments shown in FIGS. 5 through 8, the first branch 524 and the second branch 526 may be fluidly coupled to the first fuel supply 506. In some embodiments, such as the embodiments shown in FIGS. 5 and 6, the third branch 528 may be fluidly coupled to the first fuel supply 506. In other embodiments, such as the one shown in FIG. 8, the third branch 528 may be fluidly isolated from the first fuel supply 506. In such embodiments, the third branch 528 may be fluidly coupled to a second fuel supply 507. In some embodiments (as shown in FIG. 7), the third injection stage 518 may be unfueled, such that it is not fluidly coupled to either of the first fuel supply 506 or the second fuel supply 507. In such embodiments, the third injection stage 518 may deliver a flow of fluid (e.g., air) 552 to the combustion chamber 170.

Figure 6:
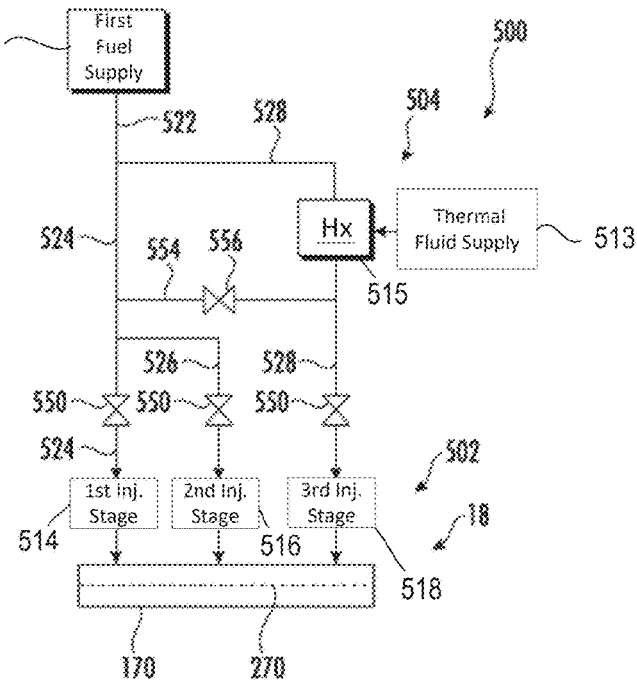
FIG. 6 is a schematic of a gas turbine combustion system in accordance with embodiments of the present disclosure.
Figure 7:
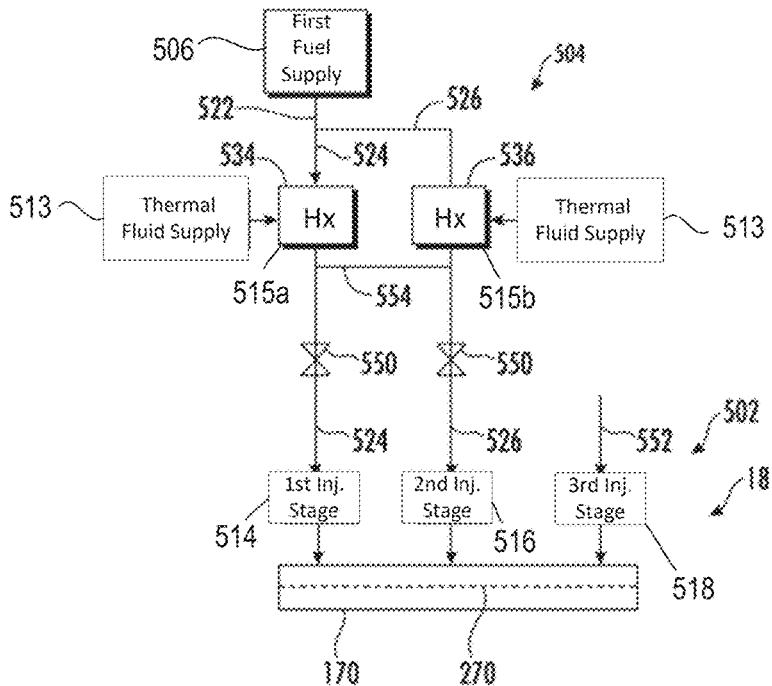
FIG. 7 is a schematic of a gas turbine combustion system in accordance with embodiments of the present disclosure.
Figure 8:
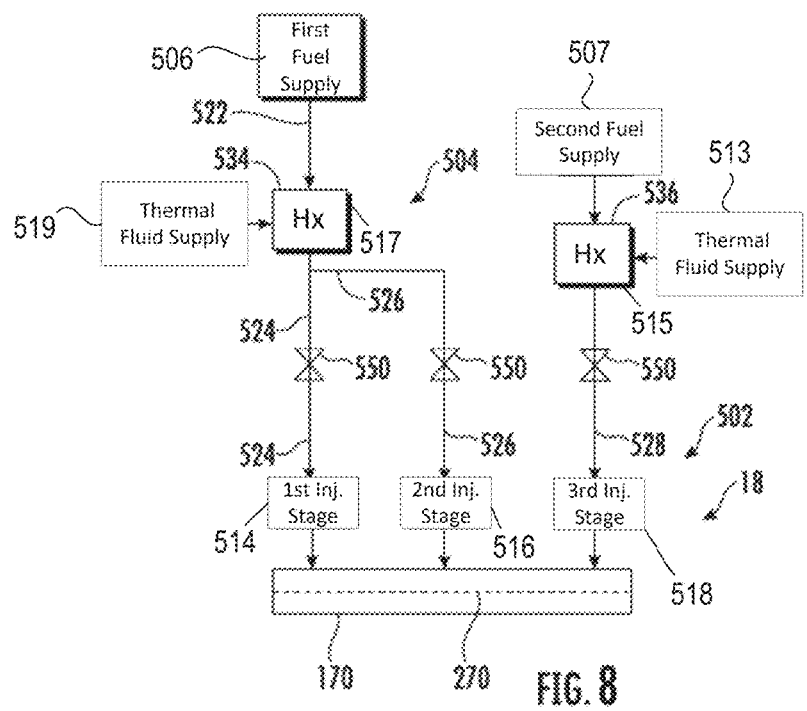
FIG. 8 is a schematic of a gas turbine combustion system in accordance with embodiments of the present disclosure.

In some embodiments, such as the embodiments shown in FIGS. 6 and 7, the fuel supply circuit 504 may include a bypass line 554 that extends between the first branch 524 and one of the second branch 526 or the third branch 528. For example, as shown in FIG. 6, the bypass line 554 may extend from the first branch 524 to the third branch 528. Alternatively, as shown in FIG. 7, the bypass line 554 may extend from the first branch 524 to the second branch 526. In some embodiments, a control valve 556 may be disposed on the bypass line 554. The control valve 556 may be actuated between an open position and a closed position. Additionally, the control valve 556 may be partially opened (e.g., not fully closed or fully open) to control a flow rate of fuel therethrough.

In exemplary embodiments, the gas turbine combustion system 500 may further include at least one heat exchanger fluidly coupled to a thermal fluid supply. The at least one heat exchanger may be disposed in thermal communication on one of the first branch 524, the second branch 526, or the third branch 528 for modifying a temperature of fuel within the branch to which the heat exchanger is attached. In particular, the at least one heat exchanger may include a first heat exchanger 534 and a second heat exchanger 536. The first heat exchanger 534 may be disposed in thermal communication on the first branch 524, and the second heat exchanger 536 may be disposed in thermal communication on one of the second branch 526 or the third branch 528 to modify a temperature of the fuel flowing therethrough.

Figure 5:
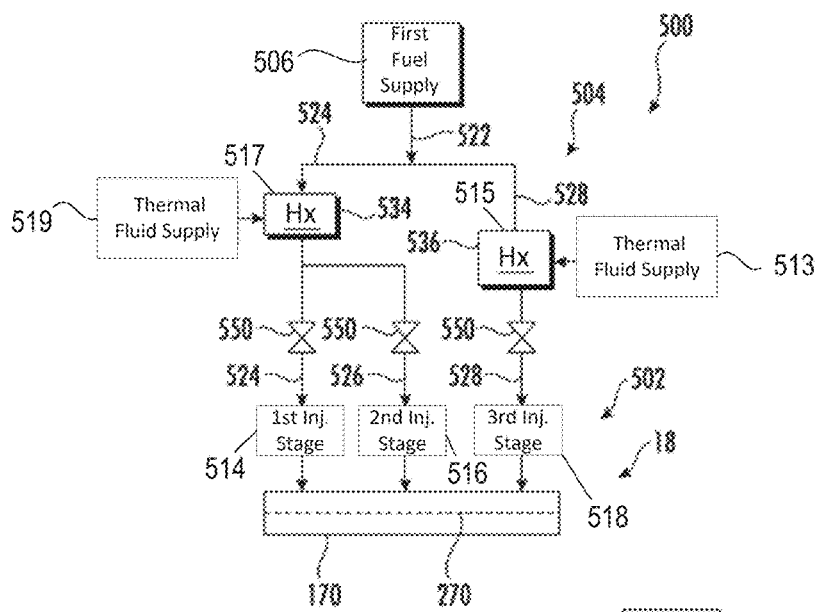
FIG. 5 is a schematic of a gas turbine combustion system in accordance with embodiments of the present disclosure.

For example, as shown in FIGS. 5 and 8, the first heat exchanger 534 may be disposed in thermal communication on the first branch 524, and the second heat exchanger 536 may be disposed in thermal communication on the third branch 528. Alternatively, as shown in FIG. 6, a high energy heat exchanger 515 may be disposed in thermal communication on the third branch 528, and the bypass line 554 connects to the first branch 524 downstream of the heat exchanger 515, thereby providing a flow of fuel with a modified temperature to the first branch 524 for mixing with the fuel from the main line 522. Alternatively, as shown in FIG. 7, the first heat exchanger 534 may be disposed in thermal communication on the first branch 524, and the second heat exchanger 536 may be disposed in thermal communication on the second branch 526. In many embodiments, the second branch 526 may extend from the first branch downstream of the first heat exchanger 534.

In exemplary embodiments, the first heat exchanger 534 and the second heat exchanger 536 may be one of a high energy heat exchanger 515 or a low energy heat exchanger 517. For example, the first heat exchanger 534 may be one of a high energy heat exchanger 515 or a low energy heat exchanger 517, and the second heat exchanger 536 may be the other of a high energy heat exchanger 515 or a low energy heat exchanger 517. Alternatively, as shown in FIG. 7, both the first heat exchanger 534 and the second heat exchanger 536 may each be high energy heat exchangers 515a, 515b. The high energy heat exchanger 515 may be fluidly coupled to a high energy thermal fluid supply 513, and the low energy heat exchanger 517 may be fluidly coupled to a low temperature thermal fluid supply 519. As should be appreciated, the high energy heat exchanger 515 may operate at a higher temperature or may exchange a greater amount of heat to the fuel supply circuit 504 than the low energy heat exchanger 517. In this way, the thermal fluid from the high energy thermal fluid supply 513 may be a higher temperature than the thermal fluid from the low temperature thermal fluid supply 519. In many embodiments, the high/low energy thermal fluid supplies 513, 519 may be standalone tanks, containers, or other structure that holds and supplies thermal fluid (e.g., water, steam, or other suitable thermal fluid) to the respective high/low energy heat exchangers 515, 517.

Alternatively, or additionally, each of the high and low energy thermal fluid supplies 513, 519 may be in fluid communication with the HRSG 32, such that the thermal fluid used in each respective heat exchanger is pulled from the HRSG 32. For example, the high and low energy thermal fluid supplies 513, 519 may be fluidly coupled to one or more of the HPECON 48, the IPECON 44, and/or the LPECON 40, such that the high and low energy thermal fluid supplies 513, 519 may supply HPECON water 68, IPECON water 69, and/or LPECON water 70 to the heat exchangers. Particularly, the high energy thermal fluid supply 513 may supply one of HPECON water 68 or IPECON water 69 to the high energy heat exchanger 515, and the low energy thermal fluid supply 519 may supply one of IPECON water 69 or LPECON water 70 to the low energy heat exchanger 517.

In many embodiments, the fuel supply circuit 504 may further include a main line 522 extending from the first fuel supply 506. In some embodiments, such as the embodiments shown in FIGS. 5 and 6, the first branch 524 and the third branch 528 may extend from the main line 522, such that fuel from the first fuel supply is divided between the first branch 524 and the third branch 528. In other embodiments, such as the embodiments shown in FIGS. 7 and 8, the first branch 524 and the second branch 526 may extend from the main line 522, such that fuel from the first fuel supply 506 is divided between the first branch 524 and the second branch 526.

In particular embodiments, as shown in FIGS. 5 through 8, fuel valves 550 may be disposed on each of the branches 524, 526, 528 for controlling a flow rate of fuel to injection stages 514, 516, 518. For example, the fuel valves 550 may be independently actuated between an open position and a closed position. Particularly, the fuel valves 550 may be selectively opened to allow for a flow of fuel from the first fuel supply 506 and/or the second fuel supply 507 to the respective injection stage 514, 516, 518. By contrast, when the fuel valves 550 are in a closed position, the flow of fuel from the first fuel supply 506 and/or the second fuel supply 507 is restricted or otherwise prevented. Additionally, each of the fuel valves 550 may be partially opened (e.g., not fully closed or fully open) to control rate of flow therethrough.

In each of the embodiments shown in FIGS. 4 through 8, when introducing fuel containing a high percentage hydrogen (greater than 80% and up to 100% hydrogen), it may be desirable to use the heat exchangers 410, 515 (515a, 515b), 517 to decrease the temperature of the hydrogen-containing fuel, thereby lowering its reactivity and the resulting flame velocity. Additionally, such decreased fuel temperature for the hydrogen-containing fuel may be desirable to control dynamics, for example, when introducing the hydrogen-containing fuel via a bundled tube fuel nozzle 300 (as shown in FIG. 3). By providing independent temperature control of each fuel stage, the gas turbine operator has greater flexibility to operate the combustion system to manage exit temperature profile, emissions, and dynamics. Having independent fuel heating for the individual fuel circuits provides for greater control of combustor nozzle exit velocity independent of the fuel mass flow. For example, a fuel circuit may be tuned for a given mass flow and have more margin against flashback since, at higher fuel supply temperature and same mass flow, the nozzle exit velocity will be higher.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

A gas turbine combustion system comprising: a combustor that includes at least two injection stages each configured to inject fuel into a combustion chamber of the combustor; a fuel supply circuit in fluid communication with the at least two injection stages for providing the fuel from a fuel supply to the at least two injection stages, the fuel supply circuit including at least two branches, wherein each branch of the at least two branches is fluidly coupled to a respective injection stage of the at least two injection stages; and at least two heat exchangers fluidly coupled to a thermal fluid supply, each heat exchanger of the at least two heat exchangers disposed in thermal communication on a respective branch of the at least two branches for modifying a temperature of fuel within the respective branch.

The gas turbine combustion system as in one or more of these clauses, wherein the at least two injection stages are axially spaced apart from one another with respect to an axial centerline of the combustor.

The gas turbine combustion system as in one or more of these clauses, wherein the at least two branches include a first branch fluidly coupled to a first injection stage of the at least two injection stages, a second branch fluidly coupled to a second injection stage of the at least two injection stages, and a third branch fluidly coupled to a third injection stage of the at least two injection stages.

The gas turbine combustion system as in one or more of these clauses, wherein the at least two heat exchangers comprise a first heat exchanger disposed in thermal communication on the first branch, a second heat exchanger disposed in thermal communication on the second branch, and a third heat exchanger disposed in thermal communication on the third branch.

The gas turbine combustion system as in one or more of these clauses, wherein the fuel supply circuit further comprises a main line extending from the fuel supply, wherein the at least two branches extend from the main line.

The gas turbine combustion system as in one or more of these clauses, further comprising a main heat exchanger fluidly coupled to a main thermal fluid supply and disposed in thermal communication on the main line upstream of the at least two heat exchangers.

The gas turbine combustion system as in one or more of these clauses, wherein a first injection stage of the at least two injection stages is a fuel nozzle mounted to an end cover and configured to inject a first flow of fuel into a primary combustion zone of the combustor.

The gas turbine combustion system as in one or more of these clauses, wherein a combustion liner extends downstream from the fuel nozzle to an aft frame, and wherein a second injection stage of the at least two injection stages is an injector coupled to the combustion liner and disposed downstream from the fuel nozzle, the premix injector configured to inject a secondary flow of the fuel into a secondary combustion zone of the combustor.

A gas turbine combustion system comprising: a combustor that includes a first injection stage, a second injection stage, and a third injection stage each configured to inject a fluid into a combustion chamber of the combustor; a fuel supply circuit in fluid communication with at least the first injection stage and the second injection stage for providing a fuel as the fluid to each of the first injection stage and the second injection stage, the fuel supply circuit including a first branch extending to the first injection stage and a second branch extending to the second injection stage; and at least one heat exchanger disposed in thermal communication on one of the first branch and the second branch.

The gas turbine combustion system as in one or more of these clauses, wherein the first branch and the second branch are fluidly coupled to a first fuel supply.

The gas turbine combustion system as in one or more of these clauses, wherein the fuel supply circuit includes a third branch fluidly coupled to the first fuel supply and extending to the third injection stage.

The gas turbine combustion system as in one or more of these clauses, wherein a third branch is fluidly coupled to a second fuel supply and extends to the third injection stage, the third branch being fluidly isolated from the first fuel supply.

The gas turbine combustion system as in one or more of these clauses, wherein the fuel supply circuit further comprises a third branch extending to the third injection stage and a bypass line extending between the first branch and one of the second branch or the third branch.

The gas turbine combustion system as in one or more of these clauses, wherein the at least one heat exchanger is one of a high energy heat exchanger or a low energy heat exchanger.

The gas turbine combustion system as in one or more of these clauses, wherein the at least one heat exchanger includes a first heat exchanger disposed in thermal communication on the first branch.

The gas turbine combustion system as in one or more of these clauses, wherein the second branch extends from the first branch downstream of the first heat exchanger.

The gas turbine combustion system as in one or more of these clauses, wherein the at least one heat exchanger includes a second heat exchanger disposed in thermal communication on the second branch.

The gas turbine combustion system as in one or more of these clauses, wherein the fuel supply circuit includes a third branch extending to the third injection stage; and wherein the at least one heat exchanger includes a second heat exchanger disposed in thermal communication on the third branch.

A combined cycle power plant (CCPP) comprising: a gas turbine comprising a gas turbine combustion system, a steam turbine, and a heat recovery steam generator (HRSG) disposed between and fluidly coupled to the gas turbine and the steam turbine, the gas turbine combustion system comprising: a combustor that includes at least two injection stages each configured to inject fuel into a combustion chamber of the combustor; a fuel supply circuit in fluid communication with the at least two injection stages for providing the fuel from a fuel supply to the at least two injection stages, the fuel supply circuit including at least two branches, wherein each branch of the at least two branches is fluidly coupled to a respective injection stage of the at least two injection stages; and at least two heat exchangers fluidly coupled to a thermal fluid supply, each heat exchanger of the at least two heat exchangers disposed in thermal communication on a respective branch of the at least two branches for modifying a temperature of fuel within the respective branch.

The CCPP as in one or more of these clauses, wherein the thermal fluid supply is in fluid communication with the HRSG.

What is claimed is:

1. A gas turbine combustion system comprising:
a combustor that includes at least two injection stages each configured to inject a respective flow of fuel into a combustion chamber of the combustor, the respective flow of fuel comprising mostly hydrogen, wherein the at least two injection stages comprises a first injection stage and a second injection stage, the first injection stage configured to inject a first flow of fuel into the combustion chamber in a direction parallel to an axial centerline of the combustor, the second injection stage configured to inject a second flow of fuel into the combustion chamber in a direction perpendicular to the axial centerline;
a fuel supply circuit in fluid communication with the at least two injection stages for providing the respective flow of fuel from a fuel supply to the at least two injection stages, the fuel supply circuit including a main line and at least two branches extending from the main line, wherein each branch of the at least two branches is fluidly coupled to a respective injection stage of the at least two injection stages;
at least two heat exchangers fluidly coupled to a thermal fluid supply, each heat exchanger of the at least two heat exchangers disposed in thermal communication on a respective branch of the at least two branches for modifying a temperature of the respective flow of fuel within the respective branch, wherein the thermal fluid supply is fluidly coupled to an economizer of a heat recovery steam generator (HRSG); and a main heat exchanger disposed in thermal communication on the main line immediately upstream of the at least two heat exchangers.

2. The gas turbine combustion system as in claim 1, wherein the at least two injection stages are axially spaced apart from one another with respect to the axial centerline of the combustor.

3. The gas turbine combustion system as in claim 1, wherein the at least two branches include a first branch fluidly coupled to the first injection stage of the at least two injection stages, a second branch fluidly coupled to the second injection stage of the at least two injection stages, and a third branch fluidly coupled to a third injection stage of the at least two injection stages.

4. The gas turbine combustion system as in claim 3, wherein the at least two heat exchangers comprise a first heat exchanger disposed in thermal communication on the first branch, a second heat exchanger disposed in thermal communication on the second branch, and a third heat exchanger disposed in thermal communication on the third branch.

5. The gas turbine combustion system as in claim 1, wherein the first injection stage of the at least two injection stages is a fuel nozzle mounted to an end cover and configured to inject the first flow of fuel into a primary combustion zone of the combustion chamber.

6. The gas turbine combustion system as in claim 5, wherein a combustion liner extends downstream from the fuel nozzle to an aft frame, and wherein the second injection stage of the at least two injection stages is an injector coupled to the combustion liner and disposed downstream from the fuel nozzle, the injector configured to inject the second flow of fuel into a secondary combustion zone of the combustion chamber.

7. The gas turbine combustion system as in claim 1, wherein each heat exchanger of the at least two heat exchangers is disposed in thermal communication on the respective branch of the at least two branches upstream of the respective injection stage of the at least two injection stages with respect to the respective flow of fuel through the respective branch.

8. The gas turbine combustion system as in claim 1, wherein the respective flow of fuel comprises greater than about 80% hydrogen.

9. A gas turbine combustion system comprising:
a combustor that includes a first injection stage, a second injection stage, and a third injection stage each configured to inject a respective flow of fuel into a combustion chamber of the combustor, the respective flow of fuel comprising mostly hydrogen, the first injection stage configured to inject a first flow of fuel into the combustion chamber in a direction parallel to an axial centerline of the combustor, the second injection stage configured to inject a second flow of fuel into the combustion chamber in a direction perpendicular to the axial centerline;
a fuel supply circuit in fluid communication with at least the first injection stage and the second injection stage for providing the respective flow of fuel to each of the first injection stage and the second injection stage, the fuel supply circuit including a main line, a first branch extending from the main line to the first injection stage, and a second branch extending from the main line to the second injection stage;
at least one heat exchanger disposed in thermal communication on one of the first branch and the second branch and in fluid communication with a thermal fluid supply, wherein the thermal fluid supply is fluidly coupled to an economizer of a heat recovery steam generator (HRSG); and
a main heat exchanger disposed in thermal communication on the main line immediately upstream of the at least one heat exchanger.

10. The gas turbine combustion system as in claim 9, wherein the first branch and the second branch are fluidly coupled to a first fuel supply.

11. The gas turbine combustion system as in claim 10, wherein the fuel supply circuit includes a third branch fluidly coupled to the first fuel supply and extending to the third injection stage.

12. The gas turbine combustion system as in claim 9, wherein the at least one heat exchanger includes a first heat exchanger disposed in thermal communication on the first branch.

13. The gas turbine combustion system as in claim 12, wherein the at least one heat exchanger includes a second heat exchanger disposed in thermal communication on the second branch.

14. The gas turbine combustion system as in claim 12, wherein the fuel supply circuit includes a third branch extending to the third injection stage; and wherein the at least one heat exchanger includes a second heat exchanger disposed in thermal communication on the third branch.

15. A combined cycle power plant (CCPP) comprising:
a gas turbine comprising a gas turbine combustion system, a steam turbine, and a heat recovery steam generator (HRSG) disposed between and fluidly coupled to the gas turbine and the steam turbine, the HRSG including an economizer, the gas turbine combustion system comprising:
a combustor that includes at least two injection stages each configured to inject a respective flow of fuel into a combustion chamber of the combustor, the respective flow of fuel comprising mostly hydrogen, wherein the at least two injection stages comprises a first injection stage and a second injection stage, the first injection stage configured to inject a first flow of fuel into the combustion chamber in a direction parallel to an axial centerline of the combustor, the second injection stage configured to inject a second flow of fuel into the combustion chamber in a direction perpendicular to the axial centerline;
a fuel supply circuit in fluid communication with the at least two injection stages for providing the respective flow of fuel from a fuel supply to the at least two injection stages, the fuel supply circuit including a main line and at least two branches extending from the main line, wherein each branch of the at least two branches is fluidly coupled to a respective injection stage of the at least two injection stages;
at least two heat exchangers fluidly coupled to a thermal fluid supply, each heat exchanger of the at least two heat exchangers disposed in thermal communication on a respective branch of the at least two branches for modifying a temperature of the respective flow of fuel within the respective branch, wherein the thermal fluid supply is fluidly coupled to the economizer of the HRSG; and
a main heat exchanger disposed in thermal communication on the main line immediately upstream of the at least two heat exchangers.

* * * * *